United States Patent [19]

Billotte et al.

[11] Patent Number: 4,479,605

[45] Date of Patent: Oct. 30, 1984

[54] HEATING SYSTEM

[75] Inventors: Keith Billotte, Clearfield; Patrick Shive, Drifting, both of Pa.

[73] Assignee: Patrick Shive, Drifting, Pa.

[21] Appl. No.: 256,787

[22] Filed: Apr. 23, 1981

[51] Int. Cl.[3] .......... F24D 3/00

[52] U.S. Cl. .......... 237/8 R; 126/172; 126/112; 126/427; 126/132; 122/15; 122/17; 122/22; 237/19; 237/66

[58] Field of Search .......... 237/8 R, 66; 126/400, 126/368, 169, 172, 132, 176 A, 361, 363, 427, 112; 122/17, 20 B, 15, 22; 62/236; 110/234

[56] References Cited

U.S. PATENT DOCUMENTS

| | | | |
|---|---|---|---|
| 905,139 | 12/1908 | Berge | 237/66 |
| 958,499 | 9/1909 | Hicks | 122/15 |
| 1,068,002 | 7/1913 | Mueller | 126/176 A |
| 1,093,386 | 4/1914 | Dempsey | 126/169 |
| 1,583,423 | 5/1926 | Rudou | 126/368 |
| 2,448,128 | 8/1948 | Trageser | 122/17 |
| 3,515,345 | 6/1970 | Barnd | 237/8 R |
| 3,896,992 | 7/1975 | Borovina et al. | 237/19 |
| 3,958,755 | 5/1976 | Cleer, Jr. | 237/8 R |
| 4,015,962 | 4/1977 | Tompkins | 62/236 |
| 4,025,043 | 5/1977 | Cleer, Jr. | 237/53 |
| 4,050,626 | 9/1977 | Awalt | 237/1 A |
| 4,157,706 | 6/1979 | Gaskill | 122/20 B |
| 4,300,536 | 11/1981 | Taschuk | 237/8 R |
| 4,303,198 | 12/1981 | Dulac | 237/8 R |

*Primary Examiner*—Albert J. Makay
*Assistant Examiner*—Henry Bennett
*Attorney, Agent, or Firm*—Steele, Gould & Fried

[57] ABSTRACT

A system for generating, storing and releasing heat comprises a tank surrounding a reservoir for holding a heat transfer fluid, heat releasing means in fluid communication with the reservoir for controllably releasing heat from the fluid to an object or space to be heated, and means for regulating flow of the fluid between the reservoir and the heat releasing means. A heat conductive fire chamber is disposed within and substantially surrounded by the reservoir, the system also comprising an air supply means for carrying combustion air to the fire chamber, and a heat conductive exhaust means for carrying hot exhaust gases through the reservoir. Access passageways are provided for fuel insertion and ash removal. Boiler tubes supporting the fuel as well as collecting heat from the fire chamber communicate with fluid in the reservoir. Shaker bars interspersed between the boiler tubes supporting the fuel may be actuated to agitate and more completely combust the fuel.

14 Claims, 7 Drawing Figures

HEATING SYSTEM

BACKGROUND OF THE INVENTION

1. Field of the Invention

This invention relates to the field of heating systems for dwellings and the like, and in particular to hot water heating systems employing solid fuel and having a reservoir to store generated heat.

2. Description of the Prior Art

A wide variety of systems useful as wood burning heaters and hot-water-based heaters are available on the market. All such systems require some form of combustion area or heat generating area and some form of heat exchanger to transfer the generated heat to the heat transfer fluid which is then circulated to remotely located radiator units. Beyond these matters in common, there are a number of variations, each of which will affect utility in different environments.

Prior art systems have been based upon both steam and hot water. In steam systems, boiler tubing was often employed in order to produce steam without the necessity of heating the entire reservoir to the point of boiling. Accordingly, in steam systems, relatively small reservoirs generally sufficed, and usually were not used to store heat. More recent systems, however, employ hot water as a heat transfer medium. Such systems also have boilers, and usually have a reservoir, the boiler contents often constituting the reservoir. Although hot water systems may be run at substantially lower temperatures than steam systems, there are certain problems with incidental generation of steam and also with the variation in the volume of gas (i.e., air) dissolved in the water at different temperatures. Additionally, heat transfer fluid will expand somewhat when heated. These matters each cause variations in the total volume of heat transfer fluid which must be accomodated. The variation in volume due to temperature variation is proportional to reservoir volume, and stresses due to excessive pressure may cause a sealed system to fail. Although resilient expansion means and overflow storage tanks form a part of the art, very large reservoirs have not been employed due to such expansion problems.

With regard to the fuels used in prior art systems, it has recently become popular to employ solid fuel systems based for example on wood or coal. Wood and coal were, of course, the most common of fuels in former years. Nevertheless, the relatively inefficient designs of fireplaces and coal burning stoves from such former years have been largely abandoned. Current solid fuel burning apparatus tend to be highly sealed, and an effort is made to extract heat from the fuel slowly by limiting the flow of combustion air. Efficiency is not sought merely in order to conserve solid fuel resources. It should also be kept in mind that a more efficient system will require the user to store less fuel to heat a given space for a given time. Accordingly, savings in storage space and in user effort may be expected as well.

Attempts to increase the efficiency of solid fuel heating apparatus have not been entirely successful for reasons not directly related to efficiency of combustion. Many designers have opted for maximum efficiency at the expense of convenience and durability. The prior art teaches that efficiency may be expected to increase where a large number of heat exchangers having relatively large surface area are disposed very close to the hottest part of the combustion area. Similarly, the art teaches that increased efficiency may be expected where the combustion area is sealed and insulated to the maximum extent possible. Accordingly, designers are tempted to seal numerous heat exchangers of high thermal conductivity (e.g., copper) inside air-tight combustion areas swathed in a great deal of insulation. Prior art systems then route heat transfer fluid from the maze of heat exchangers either to and from the radiators or a relatively small but well insulated reservoir.

Of course, such tightly sealed and blanketed heat generation, storage and transfer apparatus are difficult to maintain. Creosote develops on the cooler surfaces of heat exchangers, metals of high thermal conductivity tend to corrode rapidly; varying rates of thermal expansion gradually force open joints; and, any maintanance is virtually impossible due to the complication of piping and insulation layering employed.

Accordingly, there has been a need for a very simple construction of very durable material that nevertheless exhibits a high efficiency. A system has been needed that is easily maintained and serviced in all aspects of operation. The desired system should be easy to load and empty, easy to clean, and easy and inexpensive to construct. The system should be highly efficient, and should capture and store virtually all the heat available, but the user should not be burdened with multiple heat exchangers and extensive insulation which interfere with access to system parts.

Another consideration concerns the amount of heat which may be stored in systems of various design. Large heat storage capacity would seem to imply a large reservoir. But fireplaces themselves are relatively large constructions, and if the user of a fireplace-type heat generation system is expected to devote a large volume in addition to the fireplace to the heating system, such a system would never become popular. Accordingly, there has been a need to make a very efficient use of the space allotted to a heating system. The combustion area and the reservoir of heat transfer fluid should be large enough to generate and store all the heat necessary for at least a full day, and the fireplace should be large enough to be conveniently loaded with pieces of fuel of a conveniently large size. According to prior art teachings, such requirements would necessitate devoting half the space of a standard basement to a reservoir and fire area. The present invention provides the necessary large dimensions, but does so in an efficient manner.

The present invention both conserves space and increases efficiency by immersing the entire combustion chamber in a huge reservoir of heat transfer fluid. Only such openings as are required for convenient servicing of the combustion area, e.g., loading fuel, removing ashes, supplying air and removing exhaust are provided. The system is extremely durable and is constructed entirely of heavy boiler plate materials. Like some prior art systems, boiler tubes communicating with the fluid reservoir are provided, in an upper portion of the combustion area, and in a more intimate relation to the burning fuel, doubling as fuel supports. Shaker grids interleaved with the lower boiler tubes permit the user to agitate the burning fuel, and ashes which drop therefrom are easily removed from a portal provided for that function. A heat exchanger integral with the flue extracts the last bit of heat from the escaping gases, using an arrangement having unconventional fins located on the fluid side of a gas/fluid heat exchanger. The flue is easily cleaned since the inner surface of the flue pipe is smooth and easily brushed or scraped clean.

SUMMARY OF THE INVENTION

It is an object of this invention to provide a highly efficient yet very convenient solid fuel heating system which can generate and store relatively large amounts of heat in a relatively small space.

It is also an object of this invention to maximize efficiency of regular maintenence of the heating system.

It is another object of this invention to provide a very durable heating system at a minimum expense.

These and other objects of this invention are accomplished by a system for generating, storing and releasing heat, comprising a tank surrounding a reservoir for holding a heat transfer fluid, heat releasing means in fluid communication with the reservoir for controllably releasing heat from the fluid to an object or space to be heated, and means for regulating flow of the fluid between the reservoir and the heat releasing means. A heat conductive fire chamber is disposed within and substantially surrounded by the reservoir, the system also comprising an air supply means for carrying combustion air to the fire chamber, and a heat conductive exhaust means for carrying hot exhaust gases through the reservoir. Access passageways are provided for fuel insertion and ash removal. Boiler tubes supporting the fuel as well as pasing through the fire chamber communicate with fluid in the reservoir. Shaker bars interspersed between the boiler tubes supporting the fuel may be actuated to agitate and more completely combust the fuel.

BRIEF DESCRIPTION OF THE DRAWINGS

There are shown in the drawings the embodiments of the invention that are presently preferred. It should be understood, however, that the invention is not limited to the precise arrangements and instrumentalties depicted.

DESCRIPTION OF THE PREFERRED EMBODIMENTS

Figure 1:
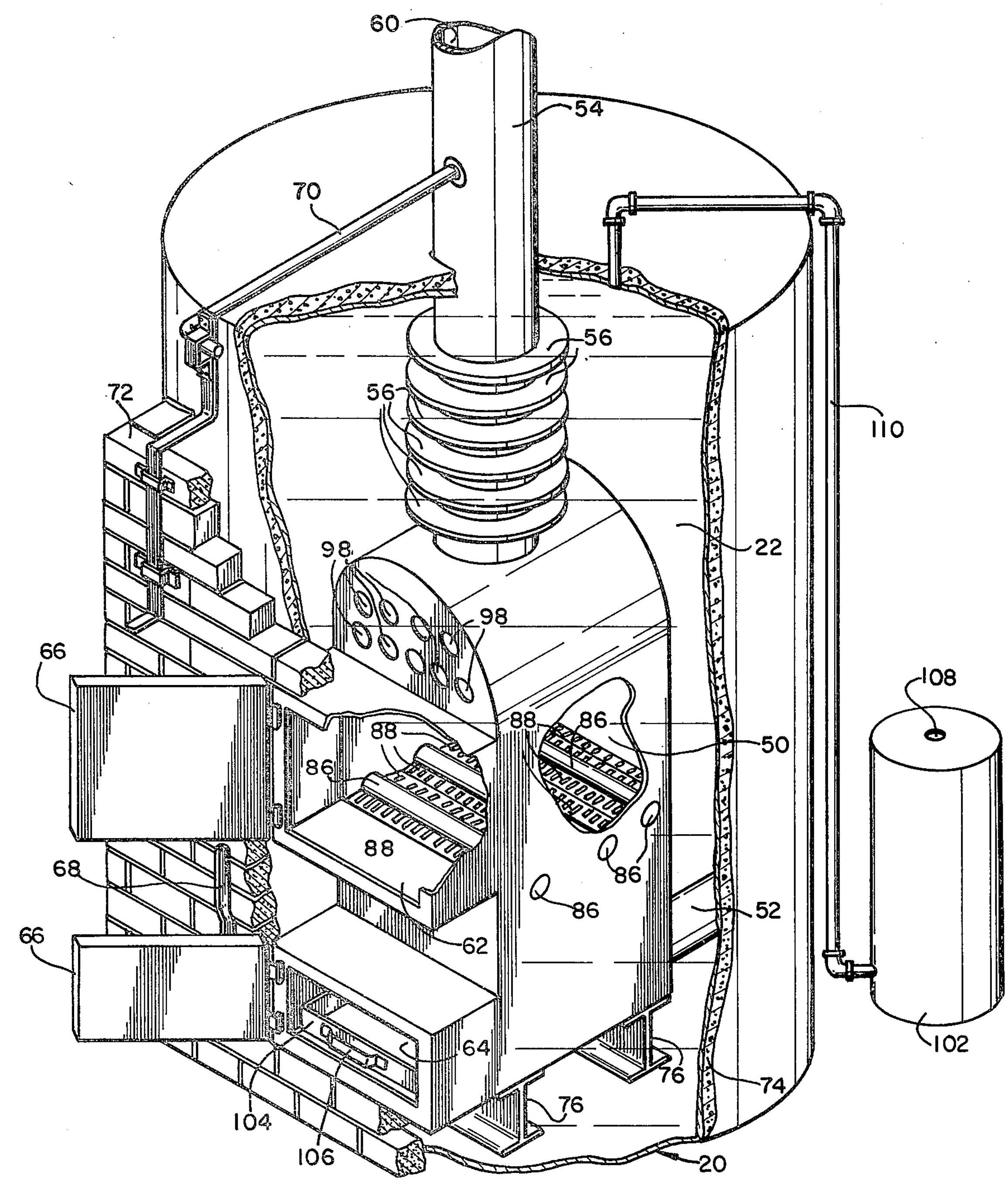
FIG. 1 is a perspective cutaway view of the heat generation and storage apparatus of this invention.

The basic attributes of the present invention can be discerned from FIG. 1. FIG. 1 depicts the heat generation and storage apparatus, the connection thereof to heat releasing apparatus being illustrated in subsequent drawings. As shown in FIG. 1, a fire chamber 50 is completely enclosed in a shell immersed except for access passageways in a tank 20 filled with a heat transfer fluid 22, for example water. The flue 54 for escaping combustion gases passes directly through the heat transfer fluid in the reservoir. An air supply 52 carries air from outside the tank (and preferably outside the building) to the combustion area. The user loads fuel via a fuel access passageway 62 having a door 66 thereupon. Ashes and other waste materials are removed via ash access passageway 64, which has as its bottom the lower surface of the shell. No other access through the reservoir to the combustion area is provided.

The entire unit may be set into a wall or equipped with a decorative front via bricks 72. Such decorations are not, of course, strictly necessary.

Inasmuch as air supply pipe 52, fuel access passageway 62, ash access passageway 64 and flue 54 extend a substantial distance from the periphery of tank 20 into reservoir 22, the combustion area is located near the center of reservoir 22, and also near the bottom thereof. The inner shell is not set directly upon the bottom of tank 20, but is supported by legs 76, for example, "I" beams. Thermally nonconductive supports may be used in place of the "I" beams shown, for example, refractory bricks.

Boiler tubes 86, 98 bring the heat transfer fluid into intimate relationship with the fire. Lower boiler tubes 86 doubles as fuel supports, and thus are directly in contact with the burning fuel. Interleaved shaker bars 88 fit closely against the boiler tubes 86 and allow air to access the fuel from below. Ashes drop through shaker bars 88, for periodic removal via tray 104 in ash access passageway 64. Boiler tubes 98, disposed at the top of combustion chamber, are directly exposed to rising hot combustion gases and flames.

Fluid in the reservoir 22 will move through the respective boiler tubes 86, 98 by convection currents driven by uneven heating of the heat transfer fluid. The hotter heat transfer fluid tending to rise, fluid within boiler tubes 86, 98 will tend to flow out of the boiler pipes, being replaced by cooler heat transfer fluid flowing in from the reservoir. As noted hereinbelow, this rising convection current can be maximized using helically-wound fins on flue 54. In any event, warmer heat transfer fluid near the center of the reservoir tending to rise, cooler heat transfer fluid will necessarily flow downwards at the periphery of the reservoir near the walls of tank 20.

A second effect of warming the heat transfer fluid in reservoir 22 is the expansion of the fluid. In order to accomodate variations in the volume of the heat transfer fluid due to variations in temperature, expansion tank 102 is disposed in fluid communication with the reservoir. The reservoir is sealed, but is not pressurized. Therefore, expansion tank 102 may be a simple tank having an air opening 108 near the top thereof, the fluid volume of the tank increasing or decreasing due to pressure in reservoir 22. As the reservoir is heated, expanding the volume of heat transfer fluid, a quantity of fluid is forced out of the reservoir through pipe 110 and into expansion tank 102. Any displaced air passes out of tank 102 through vent 108. As the reservoir cools, the contracting heat transfer fluid causes a vacuum which draws fluid back into the reservoir from tank 102. The variation in volume of fluid in tank 102 will be approximately 4–5%, assuming water as the fluid and a maximum temperature of 200° F.

Vent 108 is disposed near the highest part of the expansion tank in order that the entire capacity of the tank be useable. It is preferred that the expansion tank hold a small excess, for example ten gallons for a 100 gallon expansion tank, even when the system is cold. Any air collecting within reservoir 22 is flushed out through pipe 110, escaping through vent 108, and being replaced with fluid from tank 102 when the system cools.

Flue 54 and fins 56 comprise a heat exchanger passing the heat of escaping combustion gases to the reservoir 22 by direct contact therewith. It will be noted that gas/liquid heat exchangers are normally designed with the larger surface area of the fins being disposed at the gaseous side of the heat exchanger. The present invention is exactly contrary. Fins 56 are positioned in the fluid, the inner surface 60 of flue 54 being smooth. Fins 56 may be of a unitary construction, all the fins being connected along a sleeve which is placed over flue 54. The fins may also be circular flanges, whereby they may be stacked one upon the other on the flue. The fins are preferably merely rings, which must be individually welded to flue 54.

Figure 3:
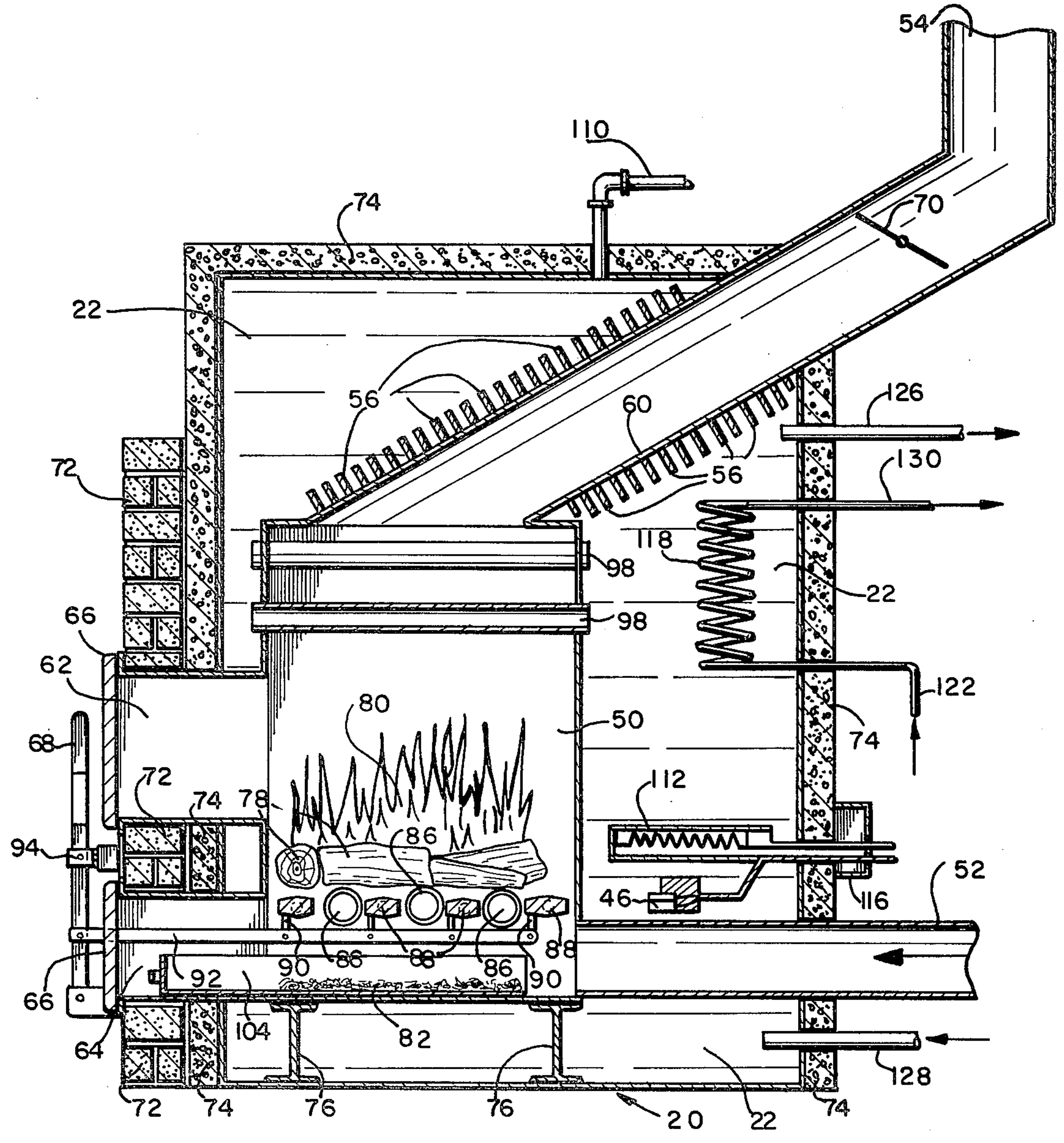
FIG. 3 is a section view taken along line 3—3 in FIG. 2.

FIGS. 1 and 3 demonstrate two alternative embodiments of finned flue 54 as well as two alternative controls for damper 70. In FIG. 1, the flue passes vertically through the reservoir, and in FIG. 3 the flue passes diagonally. Both flues include fins on the outer surface in contact with the reservoir. The present invention uses the finned flue to extract heat from a freely-burning fire. Although damper 70 can confine heat to the flue area, it is preferred that damper 70 be left well open when the system is in operation, and completely closed when the system is idle, only serving to confine heat when there is no fire. It will be appreciated that this approach departs radically from the prior art oxygen-starvation techniques, which produce dangerous creosote accumulations.

Rather than extraction of heat from a severely damped fire, the present invention contemplates extraction of heat from a cleaner and hotter, well-ventilated fire. The draft of air from supply 52, over the fuel and out through the flue is virtually unimpeded. In the embodiment, FIG. 1, the centrally-located flue permits free internal ventilation and also permits free movement of heat transfer fluid externally. Thus, although the draft moves freely, the relatively hot exhaust gases are rapidly cooled and heat extraction from the fuel is highly efficient. In the embodiment of FIG. 3, the draft also moves freely, but the diagonal passage of flue 54 through reservoir 22 results in increased surface area and more fin space. Of course, the diagonal flue is not confined to the "center" of the tank. Nevertheless, increased surface area, particularly at the lower end of flue 54, results in excellent efficiency in heat extraction.

It should also be noted that many installations will require a diagonal or horizontal span in the flue. For example, a heater installed in a basement, particularly as a retrofit, cannot practically be fitted with a flue extending vertically through the upper floors of the building. Rather, the flue will be connected to a masonry chimney or an insulated stovepipe flue mounted on an external wall of the building. By using the diagonal piping of FIG. 3, flue 54 is connected to the vertical chimney or the like at an obtuse angle, whereby movement of exhaust gases is relatively unimpeded notwithstanding the horizontal displacement between fire and chimney.

In new installations, the heater unit is preferably installed either against a wall or partially inset. In retrofit installations, the heater may be placed against a basement wall, or an excavation outside the wall may be prepared, only access passageways 62, 64 extending into the dwelling or other structure. Where the heater may be located directly under a chimney or flue, the embodiment of FIG. 1 is preferred; where the heater must be horizontally displaced from the flue, the embodiment of FIG. 3 is preferred.

The various components that make up the shell around the combustion chamber 50 and the tank 20 are constructed of thick metal in accordance with Building Code specifications for boilers. Steel boiler plate is preferred for these components, as well as for boiler tubes 86, 98, flue 54 and fins 56. Inasmuch as substantial temperature cycling will be encountered, it is helpful to construct all the components of the same material, whereby they will expand and contract at the same rates. Tank 20 is swathed in insulation 74 which may be foamed polyurethane, or any convenient insulation. Foamed polyurethane is preferred because a complete shell may be thus formed which will not tend to come unwrapped or flake apart, and which requires no strapping for support.

Figure 2:
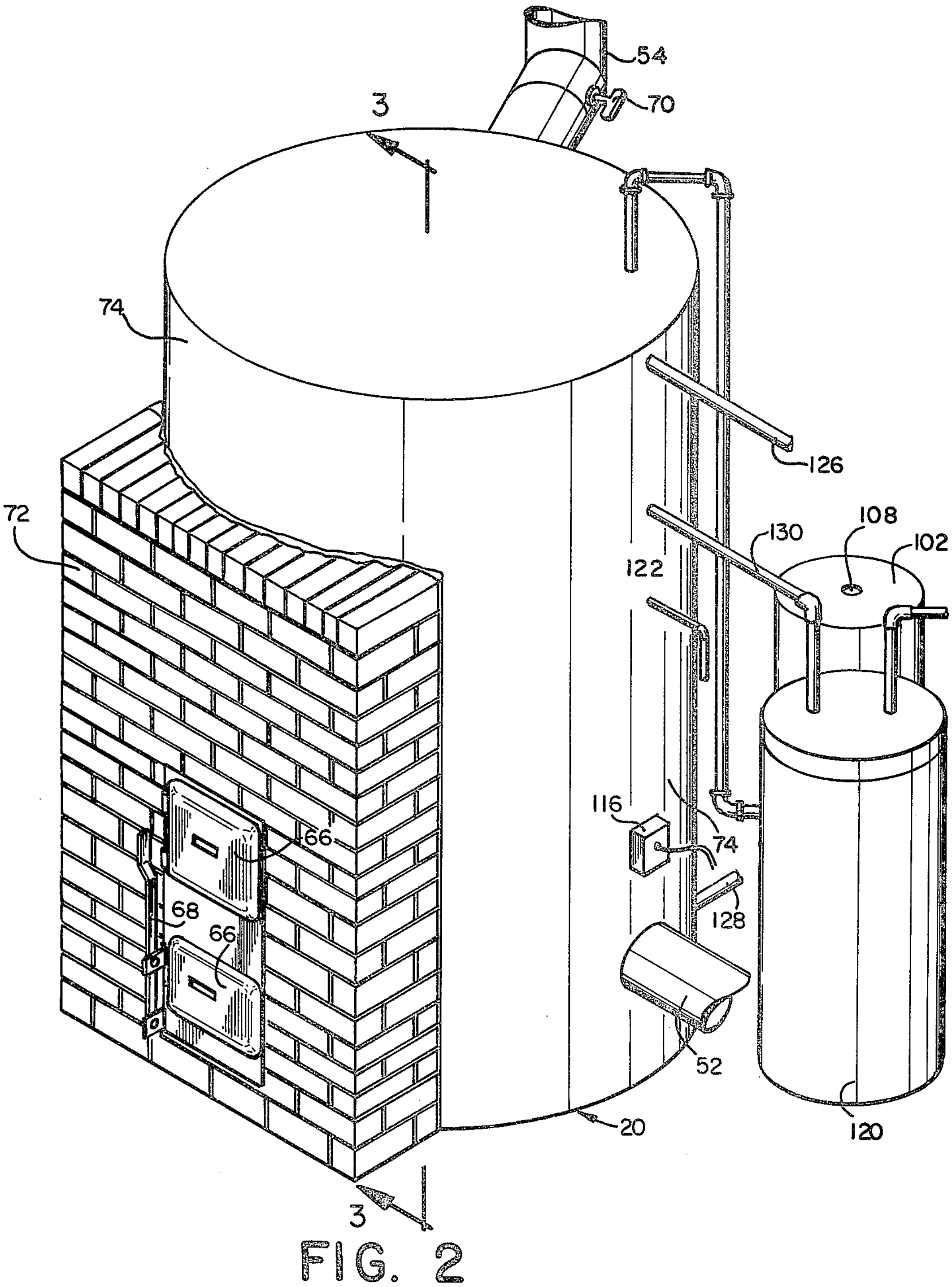
FIG. 2 is a perspective view of an alternative embodiment of the heat generation and storage system, completely assembled.

FIG. 2 illustrates the external connections to the system. Air is supplied via pipe 52 which preferably communicates with cold outside air. Although combustion air may be supplied from the space in which the system is located, such an arrangement is not preferred because warm inside air is drawn into the fire and out the flue, and heat is thus wasted. Pipes 126, 128 communicate with conventional hot water radiators. It will be noted that pipe 126, disposed at the top of tank 20 is the output of the system and the input to the radiators. Locating outgoing pipe 126 at the top of tank 20 ensures that the warmest water available will be used for heating. Similarly, return pipe 128 carrying relatively colder water arrives at the lower periphery of tank 20. As the water or other heat transfer fluid is warmed, it will rise within tank 20 to be once again piped out through pipe 126.

Also located near the top of tank 20 are connections for domestic hot water heater 120. Incoming cold potable water is routed through tank 20 via pipe 122. The potable water is warmed by heat exchanger 118 within tank 20 (shown in FIG. 3), and output at pipe 130 to domestic water heater 120. By this method, incoming cold water is preheated before being routed to the hot water heater. Each pipe carrying hot water, including pipes 128, 130, 126 are preferably wrapped in insulation in order that the fluid in the pipes not lose heat to the surrounding space. Of course, the hot water heater could be omitted and potable water warmed only by heat exchanger 118. It is preferred, however, that the water be merely preheated, whereby the relatively high temperature of the tank (e.g., 200° F.) is moderated by mixing with water in the water heater tank.

FIG. 2 illustrates the external appearance of the shaker grate handle. The preferred flue damper adjustment is illustrated in FIG. 1, having a long rotatable control bar operated by a sliding linkage. In subsequent drawings a simplified damper control is shown, for simplicity. Since the reservoir tank is quite large (e.g., 7 feet high and 7 feet in diameter, holding 2,000 gallons), a remotely actuatable damper control is quite helpful. As shown in FIG. 2, handle 68 is connected to the shaker grate via a pivot and linkage arrangement which will be discussed more completely hereinafter. It will be appreciated that both the damper control 70 and the shaker arrangement 68 can be automatically or manually controlled and/or actuated. It has been found, however, that many users prefer a more straightforward and inexpensive manually-operated system, albeit accessible from the front of the unit.

FIG. 3 illustrates the system in cross-section, the view being taken along lines 3—3 in FIG. 2 and burning fuel being shown. As generally described above, fuel 78, loaded through fuel access passageway 62, is supported by shaker bars 88 and boiler tubes 86. Contact with the burning fuel warms boiler tubes 86, and contact with rising flames and combustion gases from fire 80 warms boiler tubes 98. Ashes and coals 82 may be removed through ash access passageway 64, having open-ended tray/scoop 104 slideably disposed therein. Rising exhaust gases pass through flue 54 having smooth internal surface 60. Damper 70 controls the rate of throughput and confines a portion of generated heat to the finned area of the flue.

The prior art teaches that high efficiency solid fuel burning apparatus should be operated in an oxygen starvation situation. Where the combustion is thus limited, fuel lasts longer and extreme variations in temperature are precluded. However, since combustion is limited by lack of oxygen, many unburned hydrocarbons from incomplete combustion of fuel remain in the exhaust. These unburned hydrocarbons tend to condense on cooler surfaces exposed to the combustion gases, forming creosote. Such accumulations must be either cleaned away or they will burn away. If no action is taken, eventually a destructive fire may occur in the chimney. In order to facilitate periodic cleaning, the present invention employs a smooth inner surface 60 on flue 54. Since heat exchanger fins 56 do not obstruct cleaning apparatus, the unit is safer than units having internally disposed fins, and certainly easier to clean. In any event, the present invention is intended to fully ventilate and freely burn the fuel. Less creosote will be produced in the first place. Moreover, efficiency does not suffer because the novel arrangement in which the combustion area and flue are disposed well within the large reservoir permits full extraction of heat, as well as a hotter fire.

Shaker bars 88, interleaved with lower boiler tubes 86, are connected via to a linkage to handle 68 located outside the unit. Each shaker bar 88 pivots on its individual axis. Connection arms 90, rigidly mounted off center on each of the shaker bars 88, are connected via linkage 92 to the handle in front. Handle 68 may be manually operated, thereby rotating each shaker bar 88 by means of linkage 92. Alternatively, handle 68 (or linkage 92) may be automatically operable, for example, by means of solenoid 94. When handle 68 is pulled, manually or automatically, shaker bars 88 rotate, thereby agitating the fuel and causing excess ash 82 to fall through shaker bars 88 into tray 104 in ash accessway 64. The ash having been moved, the unburned fuel is exposed to oxygen and combusted. Tray 104 is periodically removed via handle 106 and emptied. Tray 104 may also be used as a scoop, since it is open on the end opposite handle 106.

The respective connections to the system are also shown in FIG. 3. Pipe 128 carries incoming return fluid from the radiators or other external heat-releasing devices. Pipe 126 supplies such devices from warm water in the upper area of the reservoir. Incoming cold potable water arrives at pipe 122, passes through heat exchanger 118 and is warmed, then is carried to the domestic hot water heater in pipe 130.

Electrical connections are made through junction box 116. Thermocouple 46 is disposed within reservoir 22, as is auxiliary electric heating coil 112. The thermocouple 46 provides a signal to the controller regarding the internal temperature of the reservoir. Although the thermocouple may be located at various points in reservoir 22, it is preferred that the thermocouple be located somewhat remotely from the shell surrounding combustion chamber 50, and from the boiler tubes 86, 98. Thermocouple 46 should also be located under and/or to the side of auxilary electric heating coil 112. By this means, spurious indications of internal temperature are avoided.

Auxiliary electric heating coil 112 is included to illustrate connection of sources of heat in addition to the fire 80. Electric coil 112 can be driven by a wind generator 114, or by other convenient generation means. Alternatively, a auxiliary heating means comprising a solar collector 132 can be employed, using a heat exchanger similar to heat exchanger 118, however, providing heat to reservoir 22 rather than extracting heat.

Figure 4:
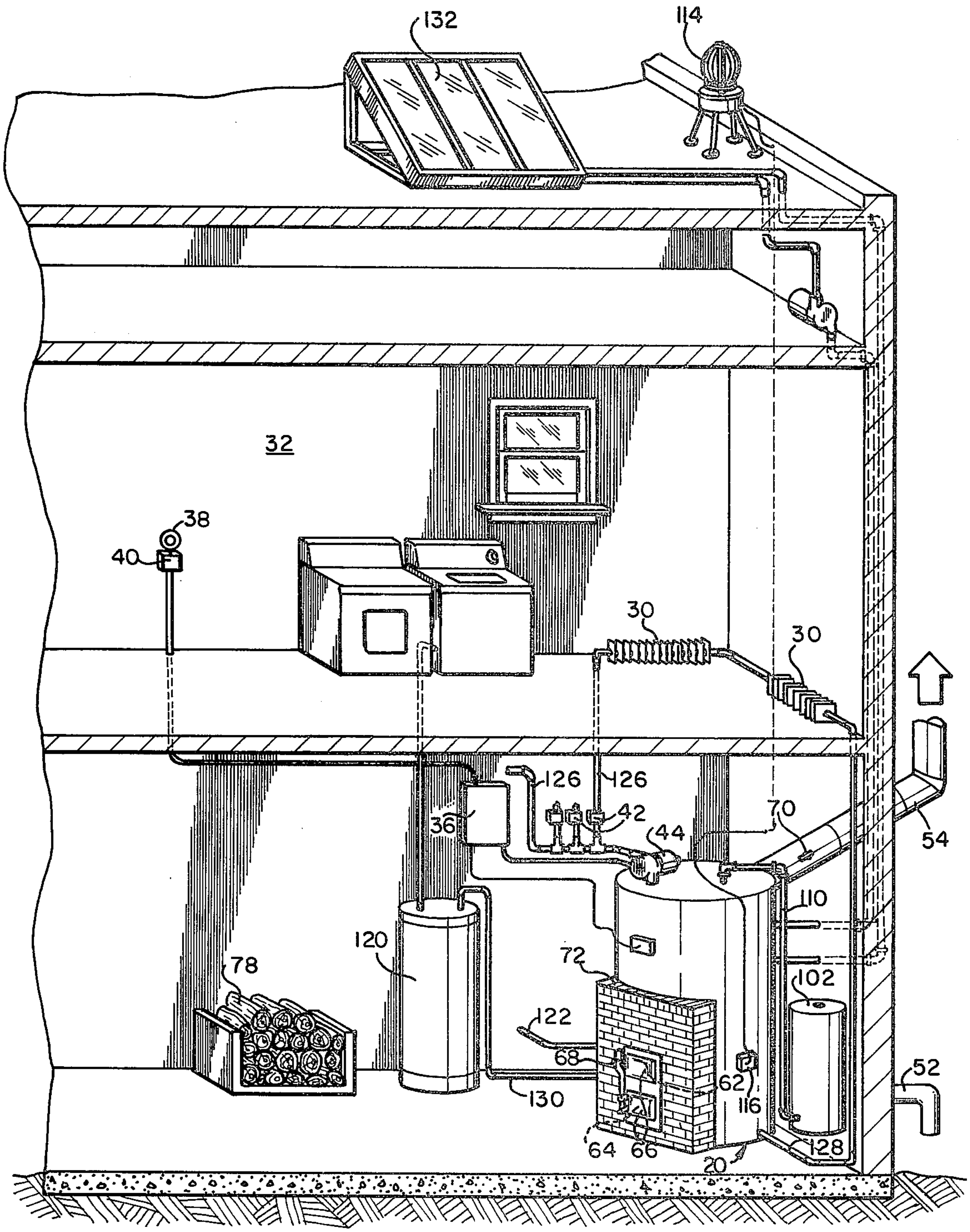
FIG. 4 is a section view of a dwelling employing the heating system of this invention.

FIG. 4 illustrates installation and use of the system of this invention in a dwelling. Tank 20 being rather larger, it is preferably located in the basement or built into a wall, preferably allowing additional space for a fuel storage area. Air supply 52 draws in outside air, rather than using warm inside air for combustion. Flue 54 includes a coupling which may be removed when the unit is cleaned, for example annually. Inasmuch as the system is operated at high temperature with free ventilation, the flue stays relatively clean, and creosote develops primarily in the chimney rather than in the heater itself.

A means for setting the desired temperature, for example thermostat 38, as well as a means for detecting the actual temperature, for example thermocouple 40, are mounted in the space to be heated 32. These signals may be used to drive indicators (not shown) informing a user of system conditions. Alternatively, the signals may be wired to a controller 36. Thermocouple 46 (shown in FIG. 3), senses the internal temperature of the reservoir. When heat is required and available, the operator or controller 36 activates pump 44 and/or so many of zone valves 42 as may be required. In a multizone system, thermostats, thermocouples and zone valves are provided for each zone. Heat transfer fluid is then pumped through pipe 126 to radiators 130, returning eventually to the reservoir via pipe 128. Expansion tank 102 may be located above or below the reservoir fluid level, but is conveniently located on the floor alongside the reservoir, which is in turn located nearby domestic hot water heater 120. Solar collector 132 and/or wind generator 114 are also connected to the reservoir, the wind generator 114 electrically connected to resistance coils 112, and the solar collector 132 connected by means of a piped heat transfer fluid loop communicating with a heat exchanger within reservoir 22.

Although reservoir 20 is quite large (e.g., 2,000 gallons) and will store a great deal of heat (e.g., a four (4) day supply), the system is compact. The entire system may be located as shown in a corner of the basement, even including storage space for fuel 78. The invention therefore avoids the waste of space necessitated by many prior art systems which locate a reservoir remote from the heat generation unit.

Figure 5A:
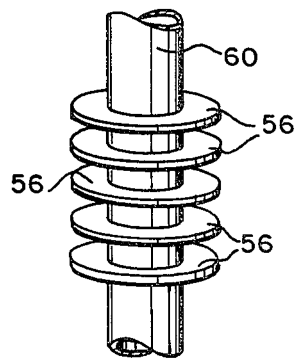
FIGS. 5*a* and 5*b* are elevation views of two embodiments of the finned flue of this invention.

As noted above, fins 56 on smooth flue pipe 60 conduct heat to the heat transfer fluid. FIGS. **5*a* and 5*b* illustrate two variations on the fined flue arrangement. In FIG. 5*a*, a perspective view of a portion of the flue, flat fin disks 56 are mounted, for example by welding, on smooth flue pipe 60. The pipe 60, warmed by hot gases passing therethrough, conducts heat to fins 56, which then conduct to heat transfer fluid in contact therewith. The heated fluid rises away from fins 56, and cooler heat transfer fluid flows into the spaces between fins 56** to be warmed. Convection currents thus warm the balance of the contents of the reservoir.

Figure 5B:
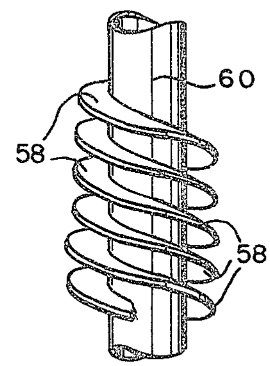

FIG. 5*b* illustrates a helical fin arrangement which may be advantageously used with the straight flue embodiment of FIG. 1. Since warmer water tends to rise, the current of heat transfer fluid within reservoir 22, namely up near the center and down near the edges, can be maximized, to provide a more uniform temperature distribution throughout tank 20. This is accomplished by mounting one or more fins in a helical manner around pipe 60. FIG. 5*b* illustrates a double helix, two fins 58 being wrapped around pipes 60 and attached, for example, by welding. As the heat transfer fluid is heated, it expands, and tends to rise. Since helical fins 58 describe a rising circular path around pipe 60, the fluid will not only rise but will tend to swirl around pipe 60, mixing the warmed heat transfer fluid with cooler surrounding fluid. Since heat transfer is maximized across the greatest difference in temperature, extra efficiency is provided by the fact that relatively cooler heat transfer fluid (i.e., well mixed), is thereby brought to pipe 60 and fins 58.

Figure 6:
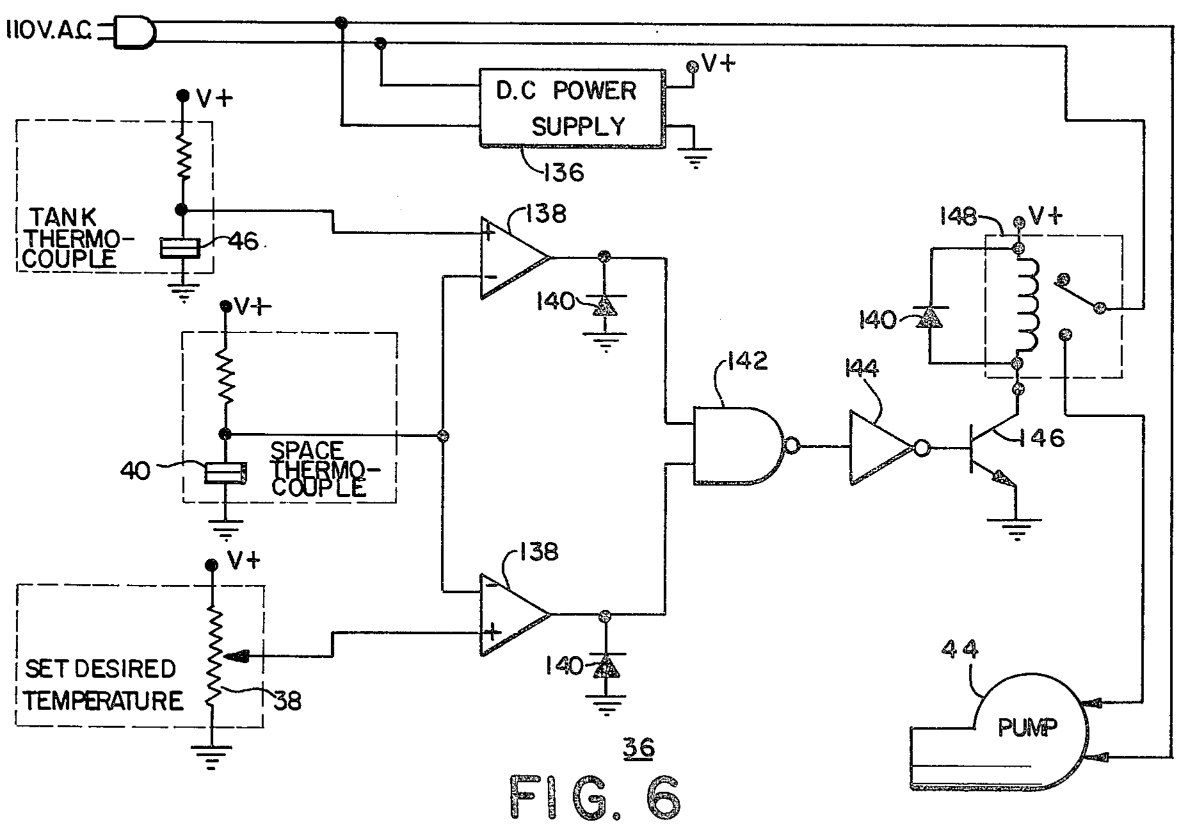
FIG. 6 is a schematic illustration of a simple controller for use with this invention.

Controllers for circulation of heat transfer fluid are commercially available. FIG. 6 illustrates a simplified controller for use with the system of this invention. Of course, the system may also be manually controlled. The depicted controller is an example schematically adapted to simulate manual operation for a single zone of heating, however, it will be apparent that the same may be expanded to encompass multiple zone systems. The controller is powered by normal 110 volt alternating current, which is rectified and filtered for direct current power to the controller. Thermocouples 40, 46 are located in the space to be heated and in the tank, respectively. The thermocouples exhibit variations in electrical resistance based upon temperature. A desired temperature level for the zone is set by means of potentiometer 38. Since the thermocouples 40, 46 are biased by resistors to the DC power supply, their temperature-driven variations in resistance appear as variations in voltage at the inputs to amplifiers 138. The amplifiers 138 have both inverting and non-inverting inputs. Amplifiers 138 are preferably operational amplifiers (op amps) characterized by high open loop gain. Since no feedback is provided, amplifiers 138 operate as comparators, the outputs rising to the positive supply voltage level when the non-inverting input voltage exceeds the inverting input voltage. Diodes 140, connected to the respective outputs of amplifiers 138, clamp the swing in voltage to positive only. Inasmuch as the amplifiers may oscillate when the inputs thereto are very nearly equal, the user may wish to employ additional circuitry as known in the art to prevent instability and repeated momentary actuation of the pump.

When the temperature of the tank exceeds the temperature of the space (i.e., a heat available situation), one input to Nand gate 142 goes true. If the desired temperature also exceeds the space temperature (i.e., a heat desired situation), then the second input to Nand gate 142 goes true, and the output goes low (i.e., true). Inverter 144 reverses the situation, such that the input to transistor 146 is high (i.e., true) when heat is both needed and available. Transistor 146 then conducts, operating relay 148 and connecting the 110 volt supply voltage to pump 44, which circulates heat transfer fluid to the radiators. An additional diode 140 is connected across the coil of relay 148, whereby the reverse voltage which develops upon collapse of the magnetic field is shorted out. It will be appreciated that a similar controller can be adapted to operate zone valves only, as opposed to a pump.

In order to apply the disclosed controller to multiple zone arrangements, separate inputs for each space would be provided for desired temperature and actual temperature. Where any of the zones indicated an actual temperature below desired temperature at that zone, and heat was available in the tank, the pump would be operated and the zone valve for that zone would be opened. If more than a single zone required heat, the pump would pump heat transfer fluid to such zone through the respective zone valve. The present controller is intended as a simple example, variations employing contact closure thermostats also being possible and useful.

Further variations on this invention are possible, and will now be apparent to those skilled in the art. Accordingly, reference should be made to the appended claims rather than the foregoing specification as indicating the true scope of this invention.

What is claimed is:

1. A system for generating, storing and releasing heat, comprising:

a tank surrounding a reservoir for holding a heat transfer fluid, the tank defining a top, bottom and side, the tank being vented to atmospheric pressure;

heat releasing means in fluid communication with the reservoir for controllably releasing heat from the fluid to a space to be heated;

means for regulating flow of the fluid between the reservoir and the heat releasing means;

a heat conductive fire chamber, the chamber being substantially smaller than the tank and disposed within the reservoir and surrounded by the reservoir on all sides an air supply means and an air exhaust means for carrying combustion air to the fire chamber and for carrying away hot exhaust gases;

an access passageway for access to the fire chamber, the access passageway connecting the fire chamber to the side of the tank;

a support spacing the fire chamber from the bottom of the tank, the fire chamber being securely attached to the same and centrally positioned within the tank, by the support, the access passageway and the air supply and exhaust means;

a plurality of spaced hollow boiler tubes disposed horizontally in the fire chamber and open to the reservoir at both ends thereof, the boiler tubes being parallel to one another;

a plurality of flat shaker grids disposed between and immediately adjacent the boiler tubes, the grids being pivotally attached to the fire chamber and individually rotatable on axes parallel to said hollow boiler tubes, the grids and boiler tubes together being operable to support burning fuel within the fire chamber and in contact with the boiler tubes; and, a linkage attached to the shaker grids, the linkage being operable to rotate the shaker grids about their axes, the linkage having a portion extending beyond the tank connected to an actuation means, whereby the fuel is agitated and ash is removed from the fuel in contact with the boiler tubes.

2. The system of claim 1, further comprising a second access passageway for removal of ash, the second access passageway also passing through the reservoir and also supporting the fire chamber.

3. The system of claim 1, wherein the exhaust means includes a heat conductive flue passing through the reservoir and a plurality of disc shaped fins are attached to the outer surface of the flue.

4. The system of claim 1, wherein the exhaust means includes a heat conductive flue passing through the reservoir, the flue having a fin helically disposed and attached to the outer surface of the flue.

5. The system of claim 1, wherein the linkage connects to an actuation member comprising a manually operable handle mounted outside the reservoir.

6. The system of claim 5, wherein the actuation member is also automatically operable by means of an electrical force exerting means.

7. The system of claim 1, further comprising at least one additional boiler tube in fluid communication with the reservoir and passing through the fire chamber, perpendicular to the boiler tube whereby the additional boiler tube extracts heat from flame and hot gas escaping from the fire.

8. The system of claim 1, wherein the heat releasing means comprises hot water radiators connected to the reservoir through at least one zone control valve, said valve adapted to be actuated by the controller upon detecting an actual temperature below a desired temperature of the space to be heated.

9. The system of claim 8, wherein the controller is also adapted to detect a reservoir temperature, and to actuate the zone control valve only when heat is available in the reservoir.

10. The system of claim 1, further comprising an expansion tank in fluid communication with the reservoir, the expansion tank storing excess fluid volume at atmospheric pressure, the excess fluid volume occurring upon expansion of the fluid during heating.

11. The system of claim 10, wherein the expansion tank is a holding tank open to air circulation at an upper area thereof, the system having a pipe connecting a lower area of the holding tank to an upper area of the reservoir.

12. The system of claim 1, further comprising an auxiliary heating means disposed within the reservoir and adapted to release heat from at least one secondary energy source.

13. The system of claim 12, wherein the auxiliary heating means is an electrical resistive heating coil wired to a wind-powered generator.

14. The system of claim 1, further comprising an auxiliary heat exchanger disposed in the reservoir for preheating domestic hot water, cold potable water being routed through the auxiliary heat exchanger on a path to a domestic water heater.

* * * * *